Aug. 10, 1954  S. J. WAKEFIELD  2,685,745
APPARATUS FOR DRYING TUBING
Filed Feb. 2, 1949
3 Sheets-Sheet 1
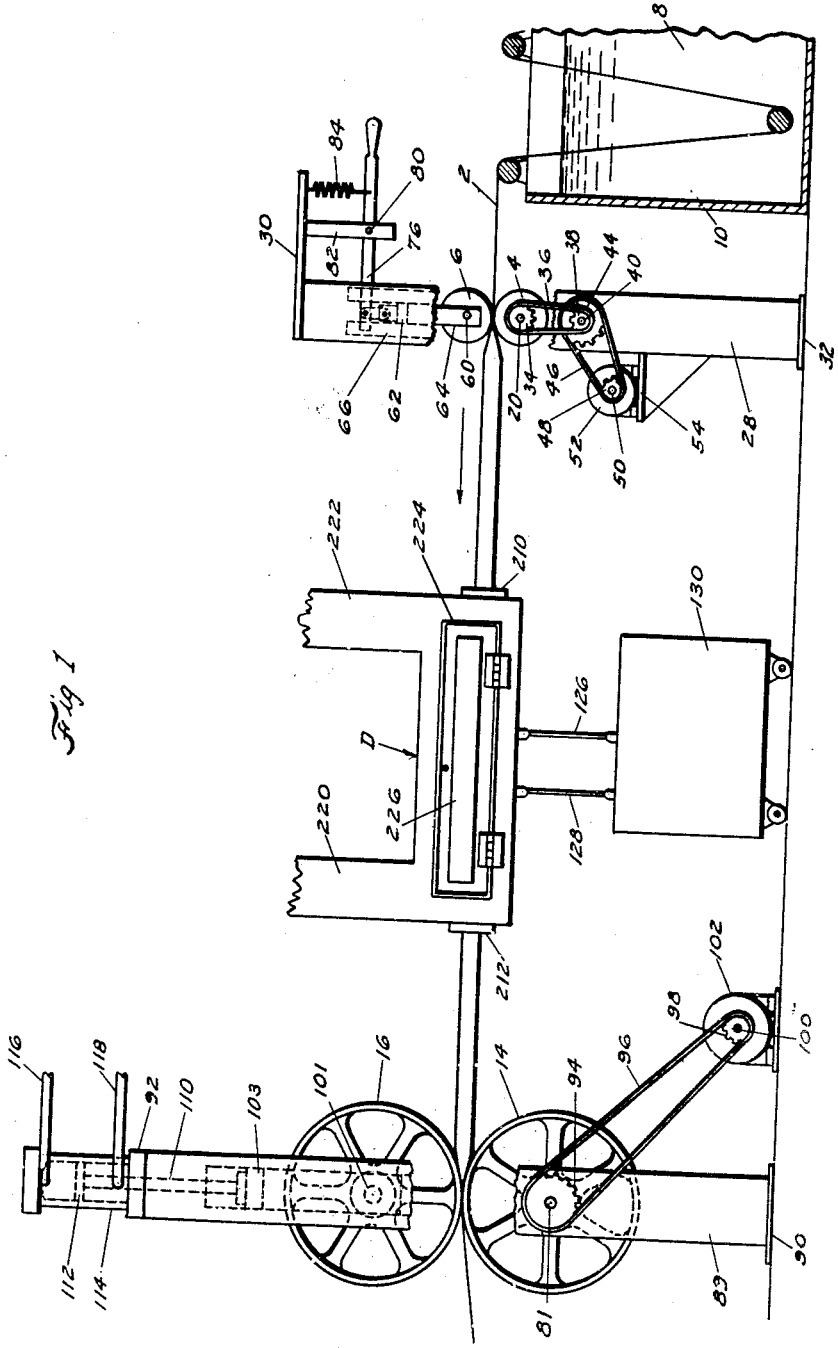
INVENTOR
SIDNEY J. WAKEFIELD
BY
ATTORNEY Aug. 10, 1954 S. J. WAKEFIELD 2,685,745
APPARATUS FOR DRYING TUBING
Filed Feb. 2, 1949 3 Sheets-Sheet 2
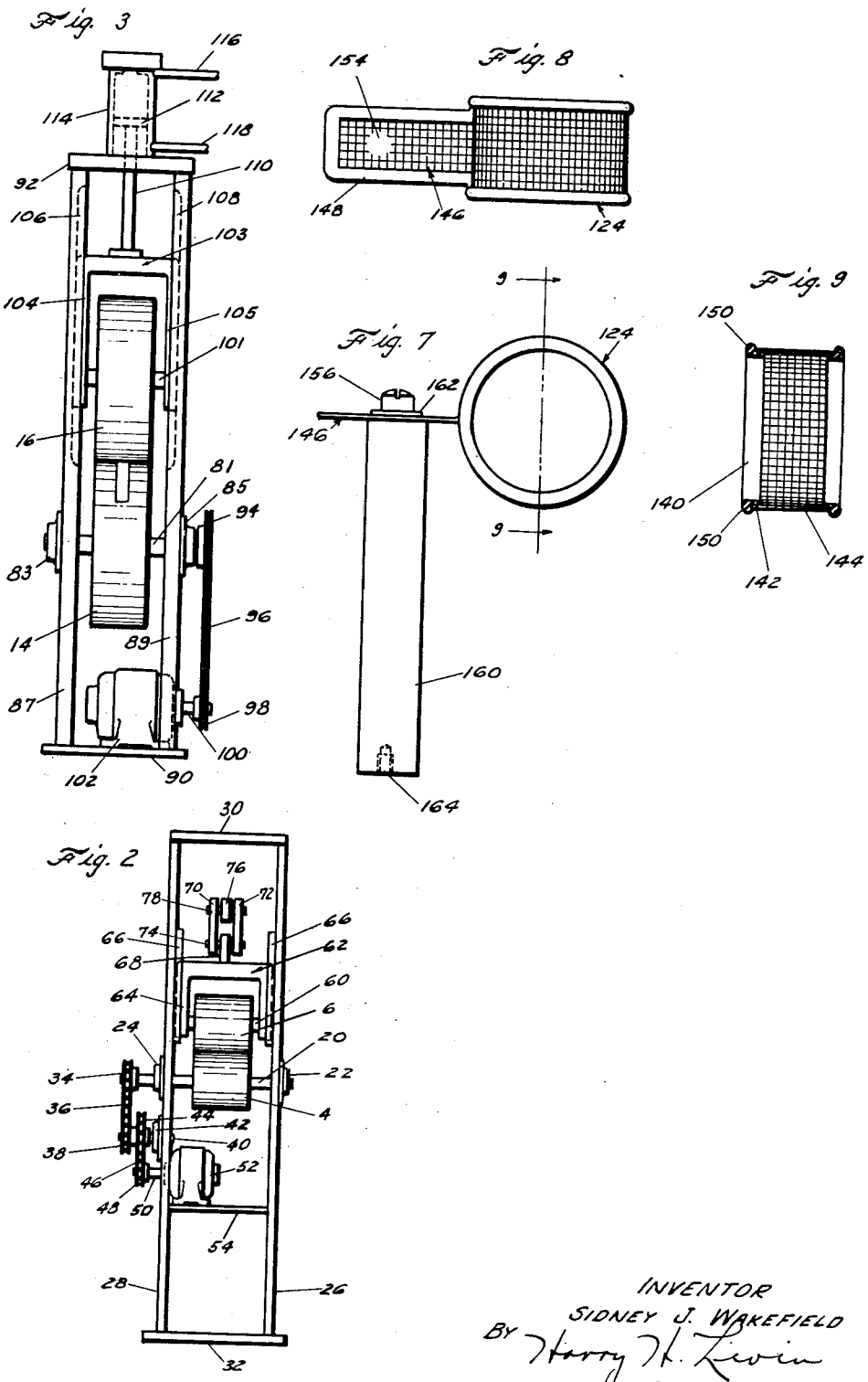
INVENTOR
SIDNEY J. WAKEFIELD
BY Harry H. Levin
ATTORNEY Aug. 10, 1954 S. J. WAKEFIELD 2,685,745
APPARATUS FOR DRYING TUBING
Filed Feb. 2, 1949 3 Sheets-Sheet 3
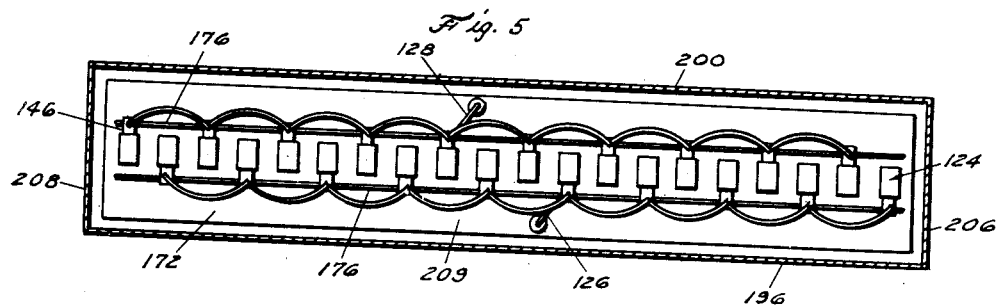
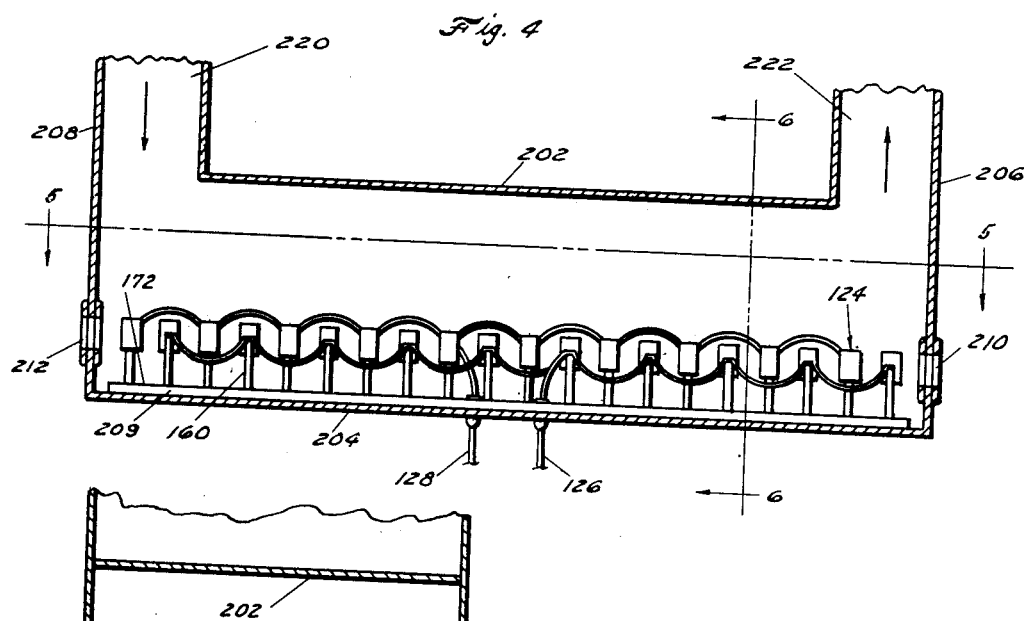
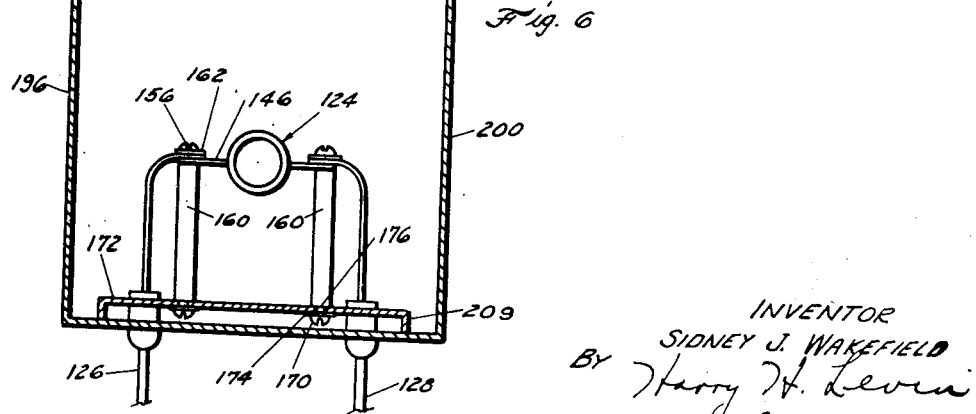
INVENTOR
SIDNEY J. WAKEFIELD
BY Harry H. Levin
ATTORNEY Patented Aug. 10, 1954

2,685,745

UNITED STATES PATENT OFFICE 2,685,745

APPARATUS FOR DRYING TUBING

Sidney J. Wakefield, Elmhurst, Ill., assignor to The Visking Corporation, Chicago, Ill., a corporation of Virginia Application February 2, 1949, Serial No. 74,105

8 Claims. (Cl. 34—1)

This invention relates to an apparatus for drying tubular material. More particularly, it relates to a dielectric apparatus for drying regenerated cellulose tubing which is to be used as sausage casings.

One of the processes of preparing regenerated cellulose tubing comprises extruding a viscose solution through an annular die into a coagulating and regenerating bath, and thereafter successively washing the seamless regenerated cellulose tubing, impregnating the washed, regenerated cellulose tubing with a softener and, finally, drying the tubing.

The method of and apparatus for drying cellulose tubing disclosed in United States Patent No. 1,967,773 was a great advance in the art and has attained considerable commercial success. According to such patent, a regenerated cellulose tubing in an inflated state was passed through a continuously supplied heated gaseous medium, such as heated air, in a housing. Due to the moisture content of the tubing to be dried, the drier was relatively long and the moisture content of the dried tubing was dependent upon human judgment in the ratio of temperature of the drier versus speed of travel versus weather changes. Such method also resulted in non-uniformly drying of both cross section and unit length. Frequently, the moisture limits of the dried casings were subject to wide variations.

An object of this invention is to provide a new and improved apparatus for drying tubing.

Another object of this invention is to provide a new and improved apparatus for producing uniformly dried products.

A further object of this invention is to provide an apparatus for drying tubing which is not dependent upon human judgment.

A further object of this invention is to provide a simple, economical, efficient and easily-to-operate apparatus for drying tubular materials.

Other and additional objects will become apparent hereinafter.

The objects of the invention are accomplished in general by subjecting a cellulose tubing in an inflated state to a high-frequency electric current induced in the wall of the tubing by passing the inflated tubing through a plurality of spaced ring electrodes electrically connected to a high-frequency generator. In one form of the invention, the ring electrodes are disposed in line and in spaced relationship preferably in a housing from which the moisture evaporated from the tubing is continuously removed.

The ring electrodes are made of a conductive material, preferably mesh or screening, and are preferably adjustably mounted in the housing whereby spacing of the electrodes relative to each other as desired can be accomplished with ease and facility. The diameter of each ring electrode is such as to provide clearance for the passage of the tubing in an inflated state therethrough. The tubing is maintained during at least the drying operation in an inflated state by means of a substantially constant bubble of a gaseous medium entrapped in the tubing by means of a pair of rolls disposed on either end of the housing in which the ring electrodes are located.

The invention is preferably used conjointly and in combination with the production of seamless regenerated cellulose tubing and when so used the steps of the process are coordinated so as to provide a continuous method and apparatus for producing flattened seamless cellulose tubing of substantially uniform moisture content.

The drier of this invention is preferably positioned so that the gel tubing will pass therethrough after it has been subjected to the last liquid treatment. If desired, the gel tubing may be predryed to remove a portion of the moisture therein as by passage through a heated environment prior to passage through the drier of this invention.

The nature of the invention will become more apparent when the following description is considered in connection with the accompanying drawings illustrating one embodiment of the invention and wherein, Figure 1 is a side elevation of an apparatus embodying the invention, Figure 2 is an end elevation showing the feed rolls and appurtenant parts thereof at the right of the drier, Figure 3 is an end elevation showing the feed rolls and appurtenant parts thereof at the left of the drier, Figure 4 is a vertical section of the drier, Figure 5 is a section taken on lines 5—5 of Figure 4, Figure 6 is a section taken on lines 6—6 of Figure 5, Figure 7 is a detail of ring electrodes and its support, Figure 8 is a top view of a ring electrode, and Figure 9 is a section taken on lines 9—9 of Figure 7.

Referring now to the drawings wherein like reference numerals designate like parts, the reference numeral 2 designates a gel regenerated cellulose tubing withdrawn by a pair of feed rolls 4 and 6 from a bath 8 contained in a tank 10. The bath 8 in the form shown is an aqueous-glycerine solution through which the regenerated cellulose tubing produced by extruding a viscose solution through a die having an annular orifice into a coagulating and regenerating bath and after washing is passed prior to drying.

The regenerated celluse tubing 2 after passing between the rolls 4 and 6 is passed through a drier generally designated by the reference character "D", hereinatfer more fully explained, by a pair of rollers 14 and 16. The tubing 2 after passing between rolls 14 and 16 is wound up on a reel provided with a compensating drive so that it will wind up the tubing at a uniform rate. Since the reel and drive are well known they are not shown in the drawings. As will be hereinafter explained, the tubing 2 passes through the drier in an inflated state.

Roll 4 is rigidly secured on a shaft 20 rotatably mounted in bearings 22 and 24 mounted on vertical members 26 and 28, respectively. The vertical members 26 and 28 are secured together by a top crosspiece 30 and a bottom crosspiece 32.

Shaft 20 on which roll 4 is mounted is positively driven in any convenient manner. In the form shown, shaft 20 is provided with a sprocket wheel 34 which is driven by a sprocket chain 36 which in turn is driven from a sprocket 38 on shaft 40 mounted in bearing 42 carried by the vertical member 28. Shaft 40 is also provided with a sprocket wheel 44 which is driven by sprocket chain 46 which in turn is driven by sprocket wheel 48 on shaft 50 of motor 52 mounted on a shell 54 carried by the vertical members 26 and 28.

As shown in Figures 1 and 2, roll 6 is located above and cooperates with roll 4. It is mounted on a shaft 60 rotatably mounted in legs 64 of a yoke 62. For reasons which will become apparent hereinafter, roll 6 is movable in a vertical direction relative to roll 4. With this in view, each leg 64 of the yoke is slidably mounted between guides 66 on the respective vertical members 26 and 28. The yoke 62 is provided with an arm 68 which extends intermediate a pair of spaced links 70 and 72 and is pivotally mounted on a pivot shaft 74 carried by the links 70 and 72. Intermediate and adjacent the upper ends of links 70 and 72, one end of a manually operable arm 76 is pivotally mounted on a pivot shaft 78 carried by said links 70 and 72. The manually operated arm 76 also is pivotally mounted on a pivot 80 carried by an arm 82 appropriately secured to an extension of the top crosspiece 30. A spring 84 having one end thereof secured to the crosspiece 30 and the other end secured to the manually operated arm 76 continually exerts a force which urges arm 76 to move counter-clockwise about the pivot 80. Due to the details of construction, this action of the spring 84 is transmitted to the links 70 and 72 and urge the yoke 62 to move downwardly with the consequence that roll 6 will be brought into intimate contact with the roll 4 and be frictionally driven thereby. When pressure is exerted on the handle portion of the manually operated arm 76 so as to exert a force which moves the arm 76 clockwise about the pivot 80, such force will be translated to and elevate yoke 62 whereby roll 6 is separated from the roll 4. The guides 66 permit movement of the yoke 62 and hence roll 6 in a vertical direction.

As shown in Figures 1 and 3, roll 14 is rigidly mounted on a shaft 81, rotatably mounted, in bearings 83 and 85, respectively, carried on vertical members 87 and 89 which are secured together by a bottom crosspiece 90 and a top crosspiece 92. Shaft 81 is provided with a sprocket wheel 94 which is driven by a sprocket chain 96, which in turn is driven by a sprocket 98 on a shaft 100 of a motor 102.

Roll 16 is located above and cooperates with roll 14. It is mounted on a shaft 101 rotatably mounted in legs 104 and 105 of a yoke 103. Leg 104 is slidably positioned in a groove 106 in vertical member 87, and leg 105 is slidably positioned in groove 108 in vertical member 89. Yoke 103 is secured to one end of a piston rod 110, the other end of the piston rod 110 being secured to piston 112 adapted to be vertically reciprocated in cylinder 114 carried on the top crosspiece 92. Cylinder 114 is appropriately connected as by lines 116 and 118 to a suitable source of pneumatic or hydraulic pressure (not shown). It is manifest that when fluid pressure is supplied through line 116, line 118 will serve as the exhaust and piston 112 will be urged downwardly. Downward movement of the piston will be imparted to yoke 102 with the result that roll 16 will be moved downwardly. When it is desired to elevate roll 16 and separate it from roll 14, fluid pressure is supplied through line 118, with line 116 serving as the exhaust. In operation, roll 16 is maintained in contact with roll 14 whereby roll 16 is frictionally driven.

As is shown in Figure 1, feed rolls 4 and 6 are on the delivery end and the rolls 14 and 16 on the discharge end of the drier "D". The tubing 2, as it passes between each of the pairs of rolls 4, 6 and 14, 16, is in a flattened, collapsed state. The invention contemplates drying the tubing in an inflated state, and with this in mind, a gaseous medium, such as air, is entrapped as hereinafter explained in the section of the tubing extending between the nips of the two sets of rolls, i. e., 4, 6, and 14, 16, respectively.

The drier "D" consists of a plurality of ring electrodes, generally designated by the reference numeral 124 of equal diameter arranged with their center axes in line and in spaced relationship. As shown in Figures 4 and 5, adjacent electrodes 124 are electrically connected to opposite polarities. One set of alternately positioned electrodes are electrically connected to lead 126, and the other set of alternately positioned electrodes are electrically connected to lead 128 of a radio frequency oscillator 130.

Each electrode 124 includes a pair of circular end members 140 arranged in spaced relationship and provided with inwardly extending flanges 142. A mesh fabric of a conductive material is wound so that the marginal edges are disposed on the flanges 142 to form ring body member 144 and the opposite ends are brought into intimate contact to provide an integral extending arm 146. The body member 144 is soldered to the end members 140 and the extending ends constituting arm 146 are also soldered together as indicated by the reference numeral 148. To prevent sparking, each end member 140 is formed with a rounded peripheral edge 150.

Arm 146 of each electrode is provided with a hole 154 and a screw 156 passing therethrough secures the electrode to a post 160 formed of an insulating material and on which it is disposed. The electrical connection is positioned intermediate the arm 146 and a washer 162.

The posts 160 are of the same height and each of them is provided with a tapped hole 164 in the bottom end thereof. As shown in Figure 6, each post 160 is separately and individually secured by a screw 170 to a support 172. A washer 174 is positioned intermediate the head of the screw 170 and the support 172.

As shown in Figure 5, the arms 146 of adjacent electrodes extend in opposite directions whereby the arms of electrodes of the same polarity extend in the same direction. This arrangement, as shown in Figures 5 and 6, requires two rows of posts 160, the posts in one row being staggered relative to the posts in the other row.

When it is desired to have the electrodes adjustable in a longitudinal direction relative to each other the support 172 is provided with a pair of longitudinally extending slots 176 and each screw 170 which secures a post 160 extends therethrough. By this construction it is manifest that each post 160 can be positioned as desired on the support 172.

The diameters of the body member 144 and end pieces 140 of each electrode are such as to provide clearance between them and the tubing passing therethrough in an inflated state.

In operation, when the gel inflated tubing passes through the electrodes, moisture is evaporated from the tubing. In order to prevent condensation of the evaporated moisture on the dried tubing and electrodes, means are provided to remove the evaporated moisture from the zone of action of the drier. With this in view, the electrodes, posts and support are positioned in a rectangular housing having a front wall 196, a rear wall 200, top member 202, bottom member 204 and opposite end walls 206 and 208. As shown in Figure 6, support 172 which carries the posts 160 is provided with side flanges 209 which rest on and are removably secured in any convenient manner to the bottom 204 of the housing.

End wall 206 is provided with an inlet opening 210 through which the inflated tubing enters the housing and end wall 208 is provided with an exit opening 212 through which the inflated tubing leaves the housing. Openings 210 and 212 are of diameters sufficient to provide clearance for the inflated tubings passing therethrough.

In order to remove the evaporated moisture from the tubing from the housing, the housing is provided with an inlet 220 adjacent the discharge end of the housing, and an outlet 222 adjacent the inlet end of the housing. A gaseous medium at an elevated temperature, such as air, at 130 to 160° F., is continuously supplied through the inlet 220, and after it passes through the housing, it leaves through the outlet 222. In general, the travel of the air in the housing is opposite to the direction of travel of the tubing and as it passes through the housing, the heated air carries with it the evaporated moisture.

To permit easy access to interior of the housing, front wall 196 is provided with a hinged door 224. A window 226 in door 224 permits inspection of the drier during operation without the necessity of opening of the door.

In operation, arm 76 is manually operated to elevate roll 6, and while roll 6 is so elevated, the tubing 2 is passed between it and roll 4. Thereafter arm 76 is released whereupon roll 6 will be lowered into and held in contactual engagement with roll 4. The tubing is then threaded through the drier housing and the ring electrodes and, finally, between rolls 14 and 16, roll 16 having been previously elevated by actuation of piston 112 in the appropriate direction. Compressed air is introduced through the leading end of the tubing until the tubing is inflated to the desired diameter. Then piston 112 is actuated in the appropriate direction and roll 16 is lowered and brought into contactual engagement with roll 14. As a consequence, a quantity of air is entrapped in the section of the tubing extending between the nips of the two pairs of rolls 4, 6, and 14, 16, and serves to inflate the section of the tubing extending between the nips of the two pairs of rolls. If, during operation, sufficient air escapes from the tubing to cause the diameter of the tubing to decrease an undesired amount, the tubing beyond rolls 14 and 16 is either severed or punctured, and thereafter roll 16 elevated and the required amount of compressed air introduced into the tubing. When the required amount of air has been introduced, roll 16 is lowered. In general, the air entrapped in the section of the tubing between the nips of the two pairs of rolls is a substantially constant isolated bubble of air which advances bodily through the advancing tubing.

The two pairs of rolls, 4, 6, and 14, 16, serve not only as tubing feeding means, but also to seal and thus entrap or isolate a bubble of the gaseous medium within the section of the tubing extending between the nips thereof. These rolls also flatten the tubing into a completely collapsed state. In general, the peripheral speeds of the two pairs of rolls 4, 6 and 14, 16, are substantially the same. However, if the tubing is to be stretched during the drying operation, the peripheral speed of roll 14 is increased the required amount over that of roll 4 to produce the desired stretch. In practice, the peripheral speeds of the two sets of rolls are such as to maintain the inflated tubing in a sufficiently taut condition so that it will not sag and contact the ring electrodes or the peripheries of the inlet and outlet of the drier housing.

In the embodiment shown in the drawing, the tubing is passed into the dryer without any predrying. However, it is to be understood that the tubing may be predryed to a predetermined moisture content prior to passage through the drier of this invention. When the tubing is to be predryed, such operation is preferably performed on the inflated tubing extending between the rolls 4, 6 and the inlet 210 of the housing; although, obviously, it can be performed on the tubing after it leaves bath 8 and prior to passage between the rolls 4 and 6.

Any high-frequency oscillator may be used, though an oscillator producing currents in the range of radio frequencies is preferred. For example, an oscillator producing a current of 25 to 30 megacycles per second and a power of 2 to 5 kilowatts has given satisfactory results. An oscillator producing a current of 27 megacycles per second and a power of 2 kilowatts is preferred.

The body members of the ring electrodes are concentric with the inflated tubing passing therethrough, and as a consequence, the tubing in the inflated state is passed through high frequency electric fields whereby a high frequency current is applied to the entire peripheral wall of the tubing passing through such fields.

The electrodes are made of electrically conductive material. Thus, for example, the end pieces of the electrodes are preferably made of metal, such as, copper, stainless steel, nickel, etc., and the body member and arm are likewise made of metal, such as, copper, stainless steel, nickel, etc.

In order to effectively and quickly remove moisture evaporated from the tubing and to prevent precipitation of such moisture on the electrodes, the body members and arms of the electrodes are preferably formed of a perforate material which permits flow of the air and moisture therethrough. The body member can be made of a metal band which has been perforated by any of the known methods. Preferably, however, the body members and arms of the electrodes are made of a metallic mesh material, such as, for example, metallic screening or mesh fabric. The dimensions of the interstices of the screening or mesh fabric are such as to permit passage of the moisture and air therethrough without interfering with the electrical properties of the electrodes and, accordingly, can vary within wide limits. Satisfactory results have been obtained when the body members and arms of the electrodes were formed of $1/16''$ to $1/8''$ copper screening. If desired, the body member of the electrodes may be formed of narrow solid bands of electrically conductive materials. In such case, the arms can also be formed of the same material.

As previously mentioned, the electrodes are of a diameter to permit the inflated tubing to pass therethrough with clearance and provide an electrical field between adjacent electrodes through which the tubing passes. The spacing and shape of adjacent electrodes are such as will not result in arcing.

The number of and spacing of adjacent ring electrodes through which the tubing passes, as well as the speed of travel of the tubing therethrough, determines the final moisture content of the product. Having selected the rate of travel of the tubing and the desired moisture content of the product, the number of electrodes and the spacing thereof can be ascertained and determined by simple empirical experiment. Manifestly, the invention can be employed to produce tubing of any desired moisture content.

The spacing of adjacent electrodes may be uniform or non-uniform in the dryer so that the drying may be less or more intense at different points in along its path of travel in the dryer. The electrodes, for example, can be so spaced that at the wet end the field is less intense than at other parts of the dryer whereby the rate of drying at the wet end is less than at the other portions of the dryer.

In one embodiment of the invention, a regenerated cellulose tubing having a diameter of $27/32''$, a wall thickness of .001'' and containing 50 per cent moisture was passed at a speed of 60 to 70 feet per minute through a dryer composed of 36 ring electrodes, spaced $3/8''$ to $1/2''$ from each other, each ring being $1\frac{1}{4}''$ in diameter and $7/8''$ long. The electrodes were connected to a high frequency oscillator through an oscillator producing a high frequency current of 27 megacycles per second and a power of approximately 2.5 kilowatts. Each electrode was made of $1/16''$ copper screening and air at a temperature of 130° to 160° F. was blown at the rate of 1,000 feet per minute through the dryer. In another embodiment of the invention, the setup and conditions were the same as in the previously described embodiment except that twelve electrodes at the wet end (entering) of the dryer were spaced about $11/16''$ apart and the remaining electrodes were spaced about $7/16''$ apart.

The product obtained in each of the above embodiments contained approximately 7% moisture and was substantially uniform throughout the length and cross-section thereof.

Once a setup is made, reasonable changes in speed of the tubing or variations in the moisture content of the tubing to be dried does not affect the final moisture content of the product. Surprisingly, the desired final moisture content as determined by the setup is automatically obtained, and no over-drying results. The inside surface of tubing dried by this invention feels dry, and when distended, offers very little resistance when two inside surfaces are rubbed together with thumb and forefinger pinching over the inside. Tubing dried by steam results in a damp, tacky feeling that offers considerable resistance to rubbing of the inside surfaces as above explained.

As is apparent from the foregoing description, the preferred embodiment of the invention contemplates drying seamless cellulose tubing prepared by the viscose process. It is, however, to be understood that the invention is not restricted thereto. The seamless tubing may be produced by coagulating and/or regenerating any aqueous cellulosic dispersion as is well known in the art. Thus, the invention also comprehends the production of regenerated cellulose tubing as may be obtained from cuprammonium and lowly esterified or etherified cellulose derivatives where there is one ester or ether group associated with several cellulose units and other cellulosic materials of similar nature. The invention is also applicable to drying of tubing produced by wet extrusion of any plastic or resin.

Although the invention has been described in connection with drying of one tubing, it is manifest that the housing may be provided with a plurality of electrodes arranged in a plurality of separate lines whereby a corresponding number of tubings can be simultaneously dried. If desired, one of the driers of this invention may be used as the predryer, when predrying is utilized.

The invention provides a simple and easy to operate apparatus and method of drying tubing. It does not require or depend on the human element. For any given setup the moisture content of the product will not be over or underdried but will be uniform throughout the length thereof. The apparatus is relatively short in length and as a consequence does not require large areas of floor space as in the case of the prior art driers.

Since it is obvious that various changes and modifications may be made in the above description without departing from the nature or spirit thereof, this invention is not restricted thereto except as set forth in the appended claims.

I claim:
1. An apparatus for drying tubing in an inflated state which comprises a plurality of ring electrodes arranged in line and spaced relationship, each of said electrodes comprising a pair of spaced flanged circular end pieces arranged with the flanges opposing each other, a perforate conductive material having a circular body portion and an integral arm extending therefrom, said circular body portion having its marginal portions disposed on and secured to said end pieces, a post made of an insulator, means to secure said arm to said post, a high-frequency oscillator connected to said electrodes whereby adjacent electrodes are of opposite polarities, and means to feed a tubing in an inflated state through said electrodes.

2. An apparatus as set forth in claim 1 including a housing wherein the electrodes and posts are positioned.

3. An apparatus as set forth in claim 2 including a housing wherein the electrodes and posts are positioned in said housing and means to pass a gaseous medium through said housing to remove therefrom the moisture evaporated from said tubing.

4. An apparatus as set forth in claim 1 including means to adjustably position adjacent posts relative to each other.

5. An apparatus for drying tubing in an inflated state which comprises a plurality of ring electrodes arranged in line and spaced relationship, each electrode comprising a perforate conductive material having a circular body portion and an integral arm extending therefrom, a post made of an insulator, means to secure said arm to said post, a high-frequency oscillator connected to said electrodes whereby adjacent electrodes are of opposite polarities and means to feed a tubing in an inflated state through said electrodes.

6. An apparatus as set forth in claim 5 including means to remove evaporated moisture from the zone of action of the drier.

7. An apparatus for drying tubing in an inflated state which comprises a plurality of ring electrodes arranged in line and spaced relationship, the spacing between the electrodes adjacent the wet end of the dryer being greater than the spacing between the electrodes in the remainder of the dryer, each of said electrodes having a circular body portion formed of a perforate conductive material and an integral arm extending therefrom, each circular body portion being of a length less than the diameter of its central opening and greater than its wall thickness, a post made of an insulator, means to secure said arm to said post, a high frequency oscillator connected to said electrodes whereby adjacent electrodes are of opposite polarities, and means to feed a tubing in an inflated state through said electrodes.

8. An apparatus for drying tubing in an inflated state which comprises a plurality of ring electrodes arranged in line and spaced relationship, the spacing between the electrodes adjacent the wet end of the dryer being greater than the spacing between the electrodes in the remainder of the dryer, each of said electrodes comprising a pair of spaced flanged circular end pieces arranged with the flanges opposing each other, a perforate conductive material having a circular body portion and an integral arm extending therefrom, said circular body portion having its marginal portions disposed on and secured to said end pieces, each circular body portion being of a length less than the diameter of its central opening and greater than its wall thickness, a post made of an insulator, means to secure said arm to said post, a high-frequency oscillator connected to said electrodes whereby adjacent electrodes are of opposite polarities and means to feed a tubing in an inflated state through said electrodes.

References Cited in the file of this patent

UNITED STATES PATENTS

| Number | Name | Date |
|---|---|---|
| 1,967,773 | Hewitt | July 24, 1934 |
| 2,397,615 | Mittelman | Apr. 2, 1946 |
| 2,402,609 | Brabander | June 25, 1946 |
| 2,405,037 | Hsu | July 30, 1946 |
| 2,485,609 | Koster et al. | Oct. 25, 1949 |
| 2,492,187 | Rusca | Dec. 27, 1949 |
| 2,546,004 | Kinn | Mar. 20, 1951 |

FOREIGN PATENTS

| Number | Country | Date |
|---|---|---|
| 656,681 | Germany | Feb. 11, 1938 |
| 540,829 | Great Britain | Oct. 31, 1941 |
| 540,830 | Great Britain | Oct. 31, 1941 |

OTHER REFERENCES

Convection Drying and Drying Calculations, by V. P. Victor, Heating and Ventilating, December 1944 (pages 67 to 81) (pages 72 and 73 relied on).